Figure 1:
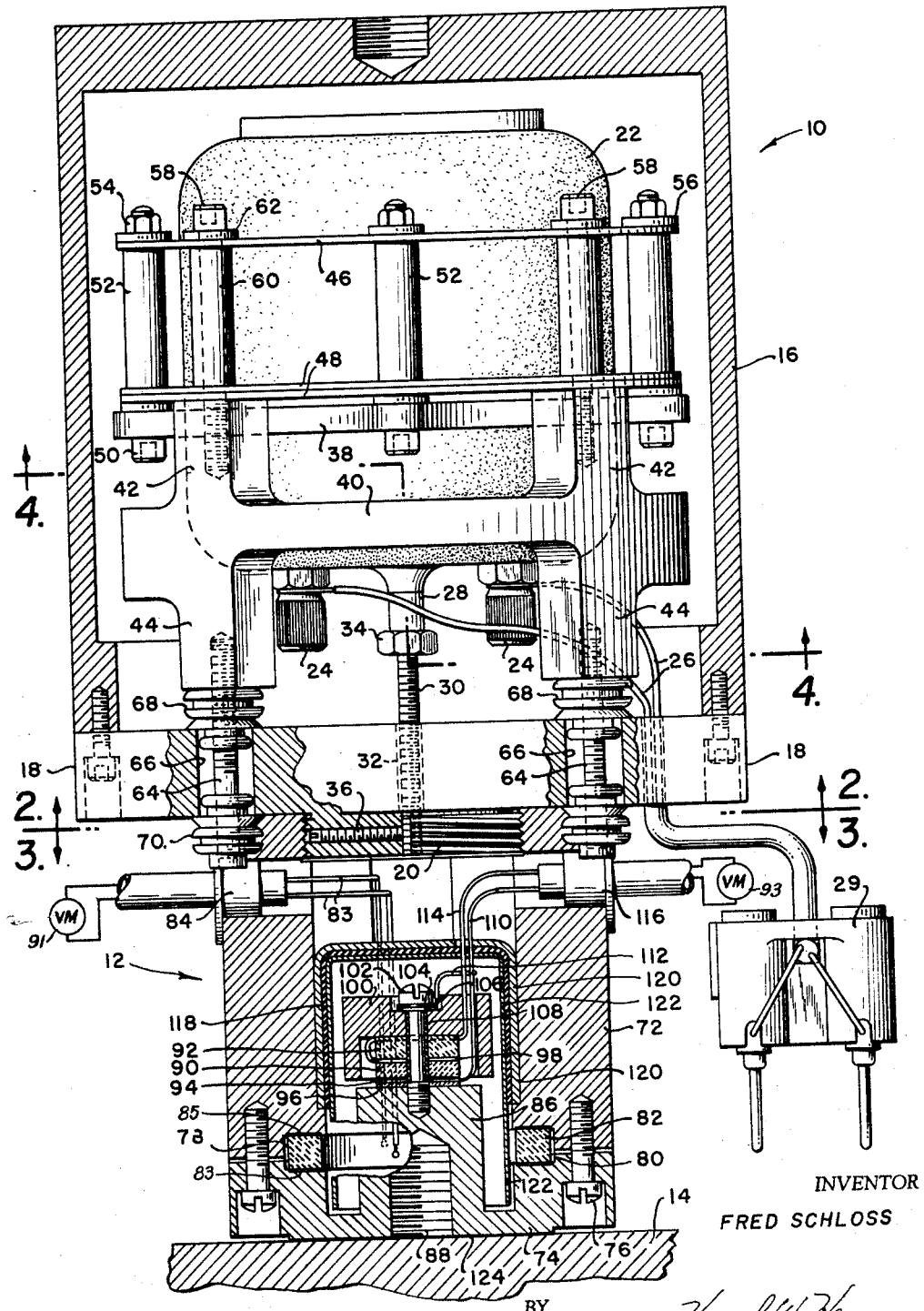

Dec. 22, 1964   F. SCHLOSS   3,162,039
MECHANICAL IMPEDANCE METER
Filed June 21, 1961   3 Sheets-Sheet 1

INVENTOR
FRED SCHLOSS

BY
*Howard W. Hermann*
AGENT.

Dec. 22, 1964    F. SCHLOSS    3,162,039
MECHANICAL IMPEDANCE METER
Filed June 21, 1961    3 Sheets-Sheet 2

INVENTOR
FRED SCHLOSS

BY Howard W. Hermann
AGENT.

Dec. 22, 1964   F. SCHLOSS   3,162,039
MECHANICAL IMPEDANCE METER
Filed June 21, 1961   3 Sheets-Sheet 3

INVENTOR
FRED SCHLOSS
BY
AGENT.

3,162,039
MECHANICAL IMPEDANCE METER
Fred Schloss, Bethesda, Md., assignor to the United States of America as represented by the Secretary of the Navy
Filed June 21, 1961, Ser. No. 118,747
17 Claims. (Cl. 73—67.1)
(Granted under Title 35, U.S. Code (1952), sec. 266)

The invention described herein may be manufactured and used by or for the Government of the United States of America for governmental purposes without the payment of any royalties thereon or therefor.

This invention relates to a device adapted to measure the mechanical impedance of a mechanical elements or structure, and more particularly to means for measuring such mechanical impedance at various different frequencies extending over a relatively wide frequency range.

Mechanical impedance is defined as the factor of proportionality between the vibratory force driving a mechanical element and the vibratory velocity this force produces, and my be expressed by the equation:

$$(1) \quad Z = \frac{F}{V} = \frac{f\omega}{A}$$

where $Z$=mechanical impedance, $F$=the driving force, $V$=the velocity, $A$=the acceleration, and $\omega=2\pi f$, where $f$ is the frequency of the driving force.

For a more complete discussion of the concept of mechanical impedance see U.S. Patent No. 1,880,425, October 4, 1932 and U.S. Patent No. 2,873,604, February 17, 1959. Each of the aforementioned patents gives a more complete description of the concept of the mechanical impedance and the uses to which such information may be put.

Heretofore, there have been no fully satisfactory instruments available for accurately and conveniently measuring the mechanical impedance, or vibratory characteristics, of a mechanical structure. The prior art devices have usually been quite cumbersome and have not been capable of producing reliable results due to the poor, structural characteristics thereof. In making mechanical impedance measurements it is necessary to provide a vibratory force and means adapted to apply such a force to an impedance measuring head. In the case of most prior art devices, the vibratory force is produced by a mechanism that is connected to the structure under test, as well as to the measuring head, which tends to introduce major inaccuracies and also proves quite cumbersome and difficult to operate. Furthermore, the prior art measuring heads are of such a nature that there is either a mechanical or electrical interaction between the various sensing elements contained therein, namely, as is usually the case, a force sensing element and an acceleration sensing elements. As is sometimes the case, the prior art devices provide mechanical interaction between certain necessary movable masses contained in the measuring head and the casing of the head, which arrangement has been found to result in substantial inaccuracies. Applicant has discovered another source of inaccuracy, namely erroneous results produced by the reaction of magnetic fields on the piezoelectric transducers of the impedance measuring head. The instant invention provides magnetic shielding, hereinafter described, optimumly located to shield the sensing elements in the measuring head from such magnetic fields.

Accordingly, an object of this invention is to provide a mechanical impedance meter adapted to overcome the disadvantages found in the prior art devices.

Another object of this invention is to provide a mechanical impedance meter and vibration generator combination, wherein, the generator is free of direct connection to the structure being tested.

A further object of this invention is to provide an impedance meter having a force sensing means and an acceleration sensing means arranged in a suitable housing.

Still another object of this invention is to provide a mechanical impedance meter having a force sensing means and an acceleration sensing means, wherein said acceleration sensing means is provided with an inertial mass that is free of connection with the impedance meter housing whereby interaction between the housing and the accelerometer sensing means is eliminated.

Still a further object of this invention is to provide a mechanical impedance meter having an acceleration sensing means, wherein said acceleration sensing means is rendered free of readings which may be induced therein by forces other than movement of an inertial mass acting thereon.

An added object of this invention is to provide a mechanical impedance meter having an acceleration sensing means that is magnetically shielded from the effects of stray magnetic fields in the area of the instrument.

Still an added object of this invention is to provide a mechanical impedance meter having a vibration generator connected with the meter at only a single point, whereby vibration of the generator is transmitted to the impedance meter at only a single point.

Figure 2:
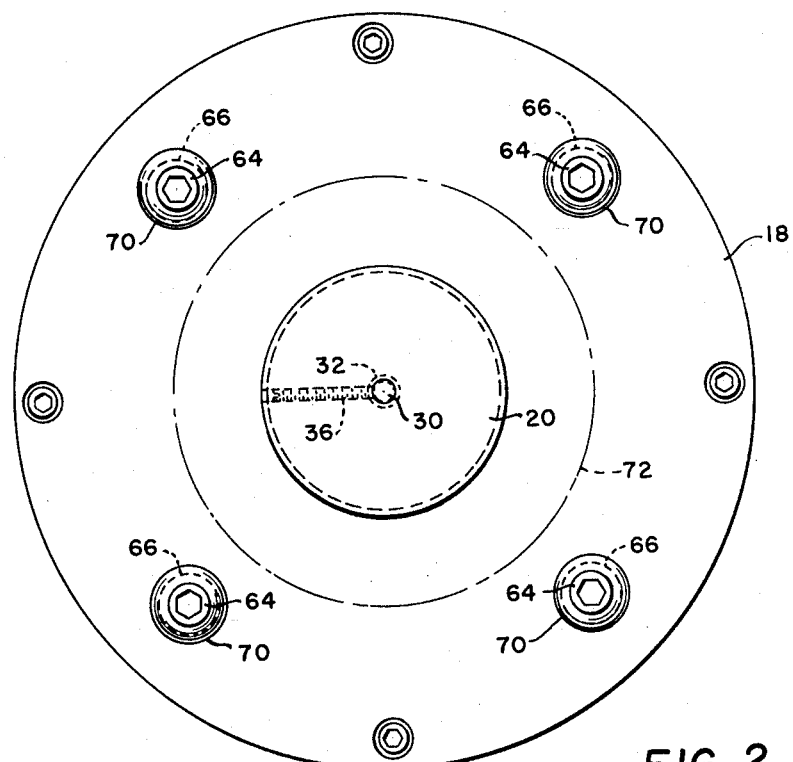
Figure 3:
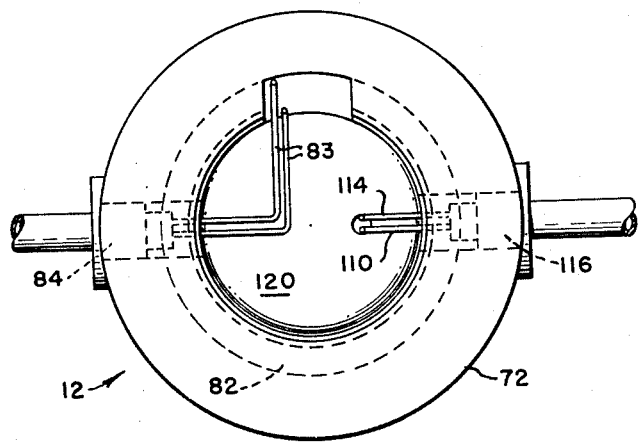
Figure 4:
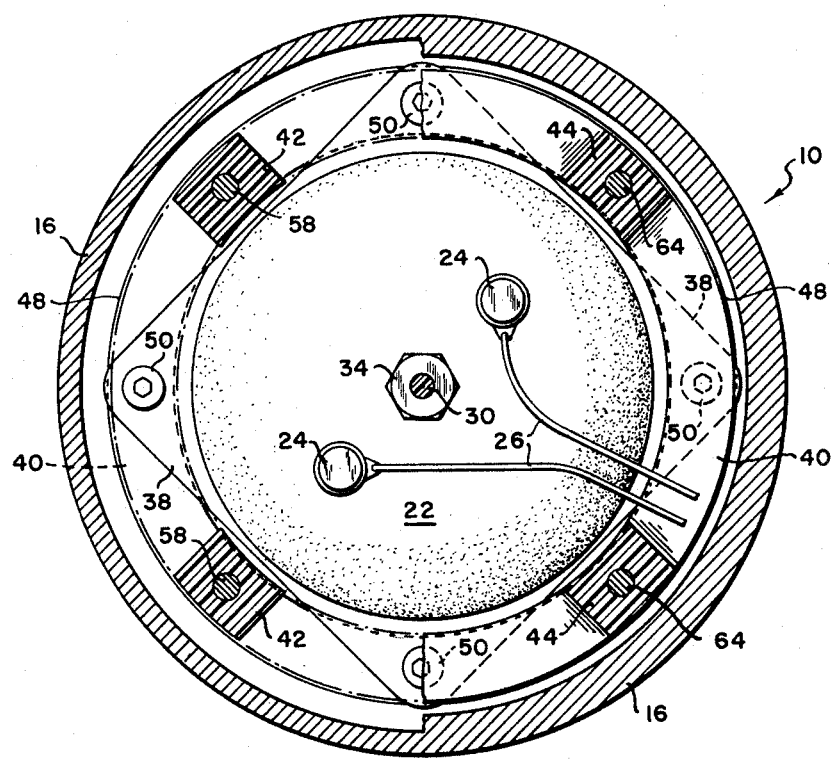

Other objects and may of the attendant advantages of this invention will be readily appreciated as the same becomes better understood by reference to the following detailed description when considered in connection with the accompanying drawings wherein:

FIG. 1 is an elevational view of the instant invention, partially in section and broken away; FIG. 2 is a sectional view of the embodiment shown in FIG. 1 looking in the direction of the arrows 2—2; FIG. 3 is a sectional view of the embodiment shown in FIG. 1 looking in the direction of arrows 3—3; and FIG. 4 is a view, partly in section and partly in elevation of the invention taken on line 4—4 of FIG. 1.

Referring to the drawings wherein like reference characters designate like or corresponding parts, the instant invention includes, as shown in FIG. 1, a vibration generator assembly 10 detachably connected to the upper end of an impedance head 12. The lower end of the impedance head 12 is adapted to be clamped, by suitable means, to a test specimen 14 such as the deck or hull of a submarine or the like.

The vibration generator 10 is enclosed by an open ended casing 16 having its lower peripheral edge bolted to an adapter 18 (FIG. 2) having a threaded boss 20 extending from the lower face thereof and adapted to extend into the top of the impedance head 12.

The vibration generator comprises an electrically driven shaker 22 of substantially conventional construction and comprising primarily an outer casing having therein, a permanent magnet and a movable coil arrangement quite similar to that generally found in radio loud speakers.

It is pointed out that the aforementioned permanent magnet within the shaker 22 is fixedly attached to the outer casing of the shaker. Inasmuch as the screw 30 is fixedly connected to the adapter 18, the casing of the shaker 22 acts as a vibrating mass of a reaction-type generator, thereby providing a vibratory force that is transmitted to the impedance head 12 via said screw 30. Screw 30 is made of nylon or the like which gives rigidity along its axis but allows for slight movements other than axial so that only axial forces are transmitted to the impedance head 12.

The movable coil (not shown) within the shaker 22 is electrically connected via a pair of binding posts 24 and a pair of electrical leads 26 to connector jack 29 which is connectible to a variable frequency electrical signal source. The coil in the shaker has fixedly connected thereto a stud 28 which has fixedly mounted thereon the threaded screw 30 that extends through a larger hole 32 formed in the center of adapter plate 18. The screw 30 is threaded in a tapped hole in the center of the central circular boss or disc 20 of the adapter 18. The screw 30 is locked against rotation at its lower end by means of a set screw 36 in a suitable radial hole in the boss 20. The threaded outer portion of boss 20 threads the inside of the top of tubular housing 72 of impedance head 12.

One of the advantages of the instant invention is that the vibratory force generated by the shaker 22 is applied to and through the cylindrical impedance head 12 to the test specimen 14 in lines practically parallel to the axis of the head. It is one of the advantages of the instant invention that the shaker 22 is so mounted on the adapter 18 as to prevent the transmission of any bending and/or other eccentrically directed forces to the impedance head. To this end, the adapter 18 and its boss 20 which receives screw 30 are stiff and rigid and firmly and tightly engage the impedance head 12; and a suitable shaker mounting arrangement is provided to effectively isolate the shaker from the adapter 18 except where the shaker is attached to the adapter via the force-transmitting screw 30.

The isolation mounting of the shaker 22 comprises a yoke 38 fixedly attached to the shaker (FIGS. 1 and 4). In addition, the shaker 22 is mounted within a round mounting yoke 40 having a plurality of pairs of juxtaposed upwardly extending bosses 42 and downwardly extending bosses 44. Each of the upwardly and downwardly extending bosses is provided with an axially extending threaded hole.

The casing of the shaker 22 is provided with lateral support, and is partially isolated from the mounting adapter 18, via a system of annular flexible mounting rings that interconnect the yoke 38 on the shaker and the mounting yoke 40. The mounting rings include an upper annular flat flexible ring 46 made of Micarta or the like, and a pair of lower similar annular Micarta rings 48. The yoke 38 is provided with a number of holes extending therethrough at substantially equally spaced points about its periphery, and through each of which an elongated bolt 50 extends upwardly through holes in rings 46 and 48. The elongated bolts 50 each carry a spacer sleeve 52 which serves to maintain the upper and lower Micarta rings 46 and 48 parallel.

Each of the elongated bolts 50 also has a nut 54 threadedly mounted on the upper end of the bolt. The respective nuts 54, the spacer sleeves 52, and the holes provided in the respective Micarta rings 46 and 48 (holes not shown) are so proportioned that the upper ring 46 is clamped between the upper end of each spaced 52 and the underside of a nut 54, there being a washer 56 interposed between each nut 54 and the upper surface of the Micarta ring 46. The lower Micarta rings 48 are clamped between the lower end of the respective spacer sleeves 52 and the yoke 38, thereby insuring that the upper and lower rings 46 and 48 are fixedly clamped in spaced relation relative to one another.

The mounting arrangement further includes a number of elongated bolts 58, each of which has its lower end threadedly mounted in one of the upwardly extending bosses 42 on the mounting yoke 40. Each of the bolts 58 has a spacer sleeve 60 mounted thereon of substantially the same length as each of the sleeves 52, and each of said sleeves 60 is interposed between the upper and lower Micarta rings 46 and 48. The upper ring 46 is clamped between a washer 62 interposed between the head of each bolt 58 and the upper end of the sleeve 60 mounted on the bolt, while the lower Micarta rings 48 are clamped between the lower end of each of the sleeves 60, and the upper end of the respective upwardly extending bosses 42.

Accordingly, the Micarta rings 46 and 48, and their manner of connection to the yokes 38 and 40 provides a flexible means for connecting the shaker 22 to the yoke 40, and at the same time provides lateral support for the shaker 22.

Each of the downwardly extending bosses 44 on the yoke 40 has threadedly mounted therein an elongated bolt 64 that extends through an enlarged hole 66 formed in the adapter 18. The lower end of each of the downwardly extending bosses 44 is mechanically isolated from the upper surface of the adapter 18 by a flexible grommet 68 made of rubber or the like. The lower end of each of the screws 64 is separated from and mechanically isolated from the lower side of the adapter 18 by a flexible grommet 70 interposed between the head of the bolt 64 and the underside of the adapter 18. Each of said grommets 68 and 70 has a portion thereof located within the hole 66, said portion being of such a dimension as to prevent lateral movement of the bolt 64 and, therefore, the entire shaker assembly.

It is emphasized that the arrangement of the bolts 64 and the vibration isolating grommets 68 and 70 associated with each of said bolts is such that the mounting yoke 40, and the structure associated therewith, is mechanically isolated from the adapter 18 and thus also from the impedance head 12, thereby preventing the transmission of eccentrically directed vibratory forces through the yoke 40 to the impedance head. Accordingly, by use of the above described shaker and shaker mounting construction the instant device provides a means for insuring that the only force transmitted to the adapter 18 and the head 12 is an axial one through the threaded screw 30.

While the vibration generator described above is shown for use in conjunction with a particular impedance head 12, it is emphasized that said generator is adapted for use on various other mechanical impedance heads, and all other devices requiring the application thereto of a vibratory force.

The impedance head 12 (FIGS. 1 and 3) includes a tubular housing 72 having an internally threaded portion at its upper end dimensioned to receive the threaded boss 20 on the adapter 18 for connection to the vibration generator 10. A removable base 74 is attached to the lower end of the housing 72 by a plurality of bolts 76 extending through the base and threaded into the housing 72.

The lower end of the housing 72 is provided with a substantially annular cutout recessed area 78 in juxtaposed relation with a similar, but shallower, annular cutout area 80 on the upper face of the base 74. The two cutout areas 78 and 80 are designed to form a space adapted to receive a substantially annular force sensing element 82 formed of a piezoelectric material, as for example barium titanate. An electrical insulating element 83 is placed under sensing element 82 and a second electrical insulating element 85 is placed on top of sensing element 83 in order to electrically insulate the sensing element 82 from the body of the impedance meter. The sensing element 82 is adapted to be compressed between the housing 72 and the base 74 in the manner hereinafter described. The force sensing element 82 is so formed and cut that the inner and outer peripheral surfaces thereof become oppositely charged when the crystal is compressed between the housing 72 and the base 74. Such compression is possible since the annular crystal 82 is of such a thickness that there is a gap between the lower end of the housing 72 and the adjacent upper surface of the base 74.

When the force sensing crystal 82 is compressed, a voltage appears across the inner and outer peripheral surfaces thereof. In order that the aforementioned voltage may be measured, the inner and outer surfaces of the crystal have bonded thereto, in a manner well known in the art, strips of electrically conductive material. The strips having suitable electrically insulated wires 83 soldered or otherwise electrically connected thereto and extending, fixedly mounted in the wall of the housing 72. The connector 84 is, of course, adapted to be connected to any suitable sort of measuring instrument whereby an indication may be obtained of the voltage potential across the inner and outer faces of the annular crystal 82 when the latter is compressed.

The base further includes an inwardly extending pedestal 86. An axially extended threaded hole 88 is formed in the pedestal 86 and is adapted to receive a threaded stud or the like (not shown) that is welded to the structure 14, whereby the base is adapted to be fixedly attached to said structure.

An accelerometer is mounted on the upper end of the pedestal 86 and includes a pair of piezoelectric crystals 90 and 92 made, for example, of barium titanate or the like. The lower crystal 90 has an electrically conductive disc or the like 94 affixed to its lower surface and electrically insulated from the pedestal 86 by a glass insulator disc 96. Another electrically conductive disc 98 is interposed between the crystals 90 and 92, and is in surface contact with both of said crystals. A cylindrical inertial mass 100 constructed in the form of an inverted cup is mounted on the crystals 90 and 92 and substantially surrounds them on three sides. The mass 100 is in surface contact with the upper face of the uppermost crystal 92, and thereby constitutes an electrically conductive member connected to the upper face of the crystal 92. The inertial mass 100 may be made of any fairly dense material such as tungsten or the like. The mass 100 and the crystals 90 and 92 are attached to the pedestal 86 by a screw 102 that extends through the mass and the crystal 90 and 92 and is threaded into the top of the pedestal 86. There is interposed between the head of the screw 102 and the mass 100 an electrically conductive disc 104, said disc 104 being in surface contact with the mass 100, but electrically insulated from the head of the screw 102 by a glass washer 106.

Thus by use of the insulating members 96, 106 and 108, the crystals 90 and 92 and the mass 100 are electrically insulated from the impedance head housing 72, and therefore from ground. The conductive discs 94 and 104 are electrically connected in parallel by a pair of leads 110 and 112. The intermediate anode 98 has an electrical lead 114 connected thereto. The leads 110 and 114 are conducted, through a suitable hole formed in the inertial mass 100, to the interior end of an electrical connector 116 fixedly mounted in the housing 72. Both leads 110 and 114 are insulated from ground.

It is pointed out that the mask 100 applies a force to the crystals 90 and 92 proportional to the acceleration to which the head 12 and therefore the mass 100 are subjected by the vibration force of the generator 22. The acceleration signal may be detected and/or measured by connection of suitable instrumentation (not shown) to the connector 116.

It is also pointed out that the accelerometer portion of an impedance head of the type shown herein may produce erroneous readings due to the presence of stray magnetic fields in the area of the instrument, which fields may be produced by other adjacent instrumentation or by the shaker 22 itself. Such stray magnetic fields may produce accelerometer readings of such a large relative magnitude as to render the normal accelerometer readings useless. For example, when the instant impedance head 12 is mounted on a non-magnetic block or support 14 and there is no acceleration, there is an output of about 25 micro-volts per gauss, without the presence of shielding.

As another example, on a submarine, with the instant instrument operating at low frequencies and with a shaker 22 having a 1 pound output, the normal output of the instant accelerometer, ignoring the effects of magnetic fields, would be about 5 micro-volts. Since the field of the one pound shaker is one gauss at the accelerometer location, the shaker produces a potential accelerometer output of as much as 25 micro-volts per gauss, which is, of course, substantially greater than the acceleration signal output itself, thereby clearly indicating that the effects of stray magnetic fields are of substantial consequence and should wherever possible be eliminated.

To this end, the instant accelerometer, and a substantial part of the pedestal 86 are provided with an inverted cup-shaped magnetic shield 118 having at least a portion of the exterior thereof so shaped as to tightly conform to the inner wall of the impedance head housing 72 so as to be fixedly held therein. It is pointed out that the cup shaped magnetic shield 118 may be formed of any suitable ferro-magnetic material such as Mumetal, or for that matter any metal having magnetic shielding characteristics.

In accordance with one embodiment of the invention, but by no means the only embodiment possible, the shield 118 is formed of an outer cup 120 having a thickness of approximately .05 inch, and having a length of one inch, and an inner cup 122 having a thickness of about .03 inch and being 1.5 inches long. The cups 120 and 122 are bonded one within the other by means of an epoxy resin or like material. It is also pointed out that instead of the shield 118 being formed in two separate cups, the entire unit could be formed in a single piece. The electrical leads 110 and 114 insulatedly pass through the shield 118 through suitable holes formed in said shield.

Calling attention once again to the effects of stray magnetic fields upon the accelerometer; it is pointed out that where an unshielded accelerometer of the instant type produces an output of 25 microvolts per gauss due to stray magnetic fields; with the use of the shielding 118 the accelerometer stray signal output is reduced to less than 2 microvolts per gauss. Thus the shield 118 reduces the effects of stray magnetic fields to substantially below the normal accelerometer output of the impedance head, which has been found to be in the order of 5 microvolts, when a shaker 22 having a one pound output is utilized in conjunction with the instrument fastened to a rigid structure on a submarine hull.

In connection with the matter of magnetic shielding, it is emphasized that in the instant invention, the impedance head housing 72, the base 74 and the adapter 18 are each made of a non-magnetic material, such as an aluminum or magnesium alloy so as to eliminate the effects of magneto-striction upon the force sensing crystal 82 and/or the acceleration sensing crystals 90 and 92. If, on the contrary, the adapter 18, housing 72 and the base 74 were all made of material having magnetic shielding qualities, there would be a change in the size of the impedance head in the event that a magnetic field passed therethrough due to the well known magneto-strictive effects of magnetic fields upon ferro-magnetic materials. Accordingly, any change in size due to magneto-strictive effects would cause erroneous readings to be obtained from the force crystal 82 and/or the accelerometer crystals 90 and 92, due to the stresses induced by the magneto-striction. It is for this reason, that only the shield 118 is made of a ferro-magnetic material having the ability to shield the acceleration sensing crystals 90 and 92 from stray magnetic fields, instead of making the entire impedance head of ferro-magnetic material. It should also be noted that any shield subject to magneto-strictive effects must, therefore, be stress-isolated from the acceleration crystals.

Thus while an impedance head made entirely of a ferromagnetic material might provide greater shielding qualities than the shield 118, such a benefit would be counterbalanced by the adverse magneto-strictive effects of stray magnetic fields upon the impedance head, and would produce worse results than would be the case if there were no shielding at all. Accordingly, the instant invention provides the best features of a non-magnetic impedance head housing structure and magnetic shielding for those elements most likely to produce erroneous readings due to the presence of stray magnetic fields.

It is pointed out that another source of spurious readings from the accelerometer might occur due to bending of some part of the accelerometer, brought about by the action of the vibratory forces transmitted through the housing 72 and the force crystal 82 to the base 74. Such bending forces would arise in the base 74, and therefore the pedestal 86, if the forces were transmitted through the base 74 to the structure 14 by such a path that the base is subjected to bending. Accordingly it is desirable, and an accomplishment of this invention, that the base 74 is subjected to pure compression only. This requires that no stresses, in any direction, are induced at the top of pedestal 86 by forces applied to base 74. To this end, the base 74 is provided with a lower face 124 so shaped and dimensioned that the vibratory force from the shaker 22 is transmitted through the housing 72, the annular crystal 82 and thence through the base 74 to the surface of the member 14 in straight unbroken lines only, in such a manner that the base 74 is in compression only. It is emphasized that no bending strains are created in the base 74, since that part of its lower surface 124 in contact with the structure 14 is directly under, and juxtaposed to that portion of the crystal 82 that is in surface contact with the upper surface of the base 74. Thus vibratory forces travel in a straight line through the crystal 82, the base 74 and the surface 124, to the test specimen.

Bending and/or compression in the base 74 produces spurious readings from the accelerometer due to lateral expansion and/or contraction of the pedestal 86 and hence the crystals 90 and 92.

It is pointed out that in the instant invention, all of the electrical elements, that is, the various crystals and the electrical means attached thereto are all insulated from the body of the impedance meter and therefore are not grounded. Ungrounded circuitry provides a balanced force and acceleration output for use with conventional differential amplifiers, so as to eliminate ground loop problems and power frequency pick-up, all of which makes possible the measurement of acceleration levels of a much lower order than is possible where grounded circuitry is used.

Utilizing the instant invention, the impedance head base 74 is either bolted or otherwise suitably, firmly attached to the mechanical element 14 under test, after which a current of desired magnitude and frequency is applied through the connector 29 to the shaker 22. The moving coil within the shaker 22 is energized by the current passing through the leads 26 causing a reaction force on the part of the casing of the shaker 22, which acts as a vibration mass. The vibrations are transmitted, via the screw 30, the adapter 18, the impedance head housing 72, the force sensing crystal 82 and the base 74 to the mechanical 14 element under test. The annular crystal 82 shows a voltage across its inner and outer peripheral surfaces that is proportionate to the magnitude of vibratory force applied to its opposite end faces by movement of the impedance head housing 72 relative to the base 74. The amount of movement of the housing 72 relative to the base 74 of course depends upon the nature of the force produced by the shaker 22 and the nature of the element 14 under test.

The acceleration imparted to the element 14 under test is detected by the accelerometer crystals 90 and 92 by virtue of the movement of the inertial mass 100 relative to the pedestal 86 which movement strains the crystals 90 and 92, thereby causing an output voltage across said crystals which voltage may be detected across the leads 110 and 114 which in turn are adapted to be connected to a suitable voltage measuring device.

Suitable, well known instrumentation such as voltmeters 91 and 93 of the type referred to in the co-pending application Serial No. 846,214, filed October 13, 1959, now Patent No. 3,070,996, or the Samsel patent No. 2,873,604, is adapted to be connected to the respective connectors 84 and 116 to detect and/or measure voltages appearing across the force crystal 82 and the acceleration crystals 90 and 92 respectively.

In addition, as is usually the case in the measurement of mechanical impedance, it is desirable to know the relative phase angle of the voltages across the force sensing crystal 82 and the acceleration sensing crystals 90 and 92. In such a case, suitable phase angle measuring instrumentation is connected in parallel with the aforementioned voltage sensing and measuring instrumentation. Examples of phase meters will likewise be found in the aforementioned application and patent, and since they do not form a part of this invention they will not be described in greater detail in this application.

It is emphasized that the instant invention provides a relatively simple and fool proof vibration generator, and mechanical impedance head, adapted for use either together or separately in other combinations. Insofar as the vibration generator 10 is concerned, it is pointed out that the instant vibration generator is so constructed as to provide an axially extending vibratory force that is always either in compression or tension only. The instant vibration generator 10 is so constructed that it is very unlikely to apply any sort of eccentric vibratory forces to a mechanical impedance head, or any other structure being subjected to the vibrations produced by the generator; this feature flows from the above described structure provided in accordance with the instant invention for supporting the shaker 22 and the manner of connection of the shaker vibratory element 30 with the adapter 18.

The mechanical impedance head itself, namely element 12, is relatively simple and fool-proof in construction, and by virtue of the magnetic shielding 118 provided therein is essentially free of the effects of any stray magnetic fields that might be present in the area of the head. The impedance head is also provided with a base 74 of such a construction such that it is nearly impossible to place said base in anything other than pure compression or tension, thus making the base almost completely free of bending strains.

It should also be noted that the acceleration sensing mass 100 in the instant impedance head is free of any mechanical or electrical attachment with the impedance head housing 72 as is sometimes the case in prior art devices of this nature. This lack of physical connection with the impedance head housing has been found to produce materially more accurate results than is the case where such acceleration sensing masses, as element 100, are attached to the housing 72 by springs or other supporting elements. A supported acceleration mass of the type found in the prior art has been found to result in the accelerometer crystals detecting force vectors as well as acceleration vectors due to the transmission of such force vectors through the housing and the acceleration mass supporting elements to the crystals.

Various modifications are contemplated and may obviously be resorted to by those skilled in the art without departing from the spirit and scope of the invention, as hereinafter defined by the appended claims.

What is claimed is:

1. A device for measuring mechanical impedance of a mechanical element, comprising, a mechanical impedance head, a mechanical vibration generator connected to one end of said impedance head, said impedance head comprising a force sensitive means for sensing the force imparted to said mechanical element by said vibration generator, and a piezoelectric accelerometer for measuring acceleration imparted to said mechanical element by said vibration generator, and a magnetic shield means, comprising a ferro magnetic material within said impedance head and partially enclosing said piezoelectric accelerometer to shield said piezoelectric accelerometer from the effects of stray magnetic fields thereby substantially eliminating the voltage effects produced by the stray magnetic fields reacting on the piezoelectric crystal.

2. A device for determining the mechanical impedance of a mechanical element, comprising an impedance head, a mechanical vibration generator attached to said impedance head and arranged to subject said impedance head to mechanical vibration, said impedance head including a substantially cylindrical housing attached to said vibration generator, a base portion movably connected to the lower end of said housing, a force sensitive means interposed between said housing and said base member and compressible therebetween for sensing the force imparted to the mechanical element by said vibration generator, said housing and said base member being formed of a non-magnetic material, a piezoelectric accelerometer mounted centrally of the interior of said housing on said base member for sensing acceleration imparted to said mechanical element by said vibrator and a magnetic shield means, comprising a ferro magnetic material partially enclosing said accelerometer and spaced therefrom whereby the voltages produced by the effects of stray magnetic fields upon said piezoelectric accelerometer are substantially eliminated.

3. A device for determining the mechanical impedance of a mechanical element as set forth in claim 2, wherein said base member includes a central pedestal that extends inside of, and is spaced from said housing member, said piezoelectric accelerometer comprising an electro-sensitive member mounted on said pedestal member, said electro-sensitive member having an electrical characteristic which varies in accordance with the deformation thereof; an inertial mass superimposed on said electro-sensitive member, connecting means joining said inertial mass to said pedestal member and maintaining said inertial mass in intimate contact with said electro-sensitive member and movable relative to said pedestal, whereby said electro-sensitive member is alternately dynamically stressed in tension or compression between said inertial mass and said pedestal member.

4. A device for measuring the mechanical impedance on a mechanical element as set forth in claim 2 wherein said magnetic shield means is in the form of an inverted cup-shaped member.

5. A mechanical impedance head comprising, a housing, means at one end of said housing for attachment of the head to a vibration generator, a base member movably attached to the opposite end of said housing and designed for connection to a mechanical element undergoing test, a force sensitive means interposed between said housing and said base member and adapted to provide an indication of the relative movement between said housing and said base member, a piezoelectric accelerometer mounted on said base member and located substantially axially of said housing for measuring acceleration imparted to said mechanical element by any vibratory forces transmitted through said housing and said base to said element; and a magnetic shield means, comprising a ferro magnetic material at least partially enclosing said piezoelectric accelerometer, whereby the voltages produced by the effects of stray magnetic fields upon said piezoelectric accelerometer are substantially eliminated.

6. A mechanical impedance head, as set forth in claim 5 wherein said housing and said base member are formed of a non-magnetic material.

7. A mechanical impedance meter as set forth in claim 5 wherein said base member includes a centrally located pedestal extending inside of, and spaced from said housing member, said piezoelectric accelerometer comprising an electro-sensitive member mounted on said pedestal member, said electro-sensitive member having an electrical characteristic which varies in accordance with the deformation thereof; an inertial mass superposed on said electro-sensitive member, connecting means joining said inertial mass to said pedestal member and maintaining said inertial mass in intimate contact with said electro-sensitive member and movable relative to said pedestal, whereby said electro-sensitive member is alternately dynamically stressed in tension or compression between said inertial mass and said pedestal member upon vibration of the impedance head.

8. A mechanical impedance meter as set forth in claim 5, wherein said magnetic shield means comprises an inverted, substantially cup-shaped member that surrounds and is spaced from said piezoelectric accelerometer.

9. A mechanical impedance meter as set forth in claim 5, wherein said magnetic shield means comprises an inverted cup-shaped member that surrounds and is spaced from said piezoelectric accelerometer, and is formed of two concentric nested cups.

10. A mechanical impedance meter as set forth in claim 8, wherein said magnetic shield means is made of Mumetal.

11. A mechanical impedance meter as set forth in claim 9, wherein each of said cups is made of Mumetal.

12. A mechanical impedance meter comprising, a vertical tubular housing, a base member movably attached to the lower end of said housing and spaced therefrom, said base member extending across the lower end of said housing, an annular force sensing means interposed between said housing and said base member in contact with both for compression therebetween, said base member having a lower surface shaped for contact with a surface of a test specimen, said lower surface having a portion thereof in vertical alignment with the transverse thickness of said annular force sensing member and in contact with the surface of the test specimen; a piezoelectric acceleration sensing means, including an inertial mass, centrally mounted on said base member and extending upwardly into said housing, and a magnetic shield means, comprising a ferro magnetic material surrounding and at least partially enclosing said piezoelectric accelerometer thereby substantially eliminating the voltage effects produced by the stray magnetic fields reacting on the piezoelectric crystal.

13. A mechanical impedance meter as set forth in claim 12, wherein said accelerometer includes at least one electro-sensitive member having an electrical characteristic which varies in accordance with the deformation of the member.

14. A mechanical impedance meter as set forth in claim 7 wherein said vibration generator comprises a mounting adapter connected to said housing, a vibrator having an outer casing and a vibratory means, said vibratory means being fixedly attached to the center of said adapter and extending substantially at right angles thereto, a vibrator support member resiliently attached to said adapter, and resilient means connecting the casing of the vibrator to said support member and maintaining the casing spaced from said support member in a position aligned with the center of the adapter plate.

15. A mechanical impedance meter as set forth in claim 14 wherein the mass of the vibrator is uniformly distributed about a line through the center of the adapter and perpendicular thereto.

16. A mechanical impedance meter as set forth in claim 3 wherein said vibration generator comprises a mounting adapter, a vibrator having an outer case and a vibratory member extending from said case, said vibratory member being fixedly connected to said adapter at the center thereof and extending at right angles to the adapter, a vibrator support encircling said case and attached thereto by a plurality of flexible members, said vibrator support having a plurality of bosses thereon extending therefrom and movably attached to the adapter; and a resilient vibration damping means interposed between each of said bosses and the adapter at the point of connection to said adapter, whereby vibrations are applied to the adapter only at the center thereof by said vibratory member.

17. A mechanical impedance meter as set forth in claim 16 wherein the mass of the vibrator is uniformly distributed about a line through the center of the adapter and perpendicular thereto.

References Cited by the Examiner

UNITED STATES PATENTS

| | | | |
|---|---|---|---|
| 1,904,955 | 4/33 | Schouten | 310—28 |
| 2,355,194 | 8/44 | Wiggins | 73—67.1 |
| 2,517,214 | 8/50 | Kent | 310—28 |
| 2,706,400 | 4/55 | Unholtz | 73—71.6 |
| 2,754,679 | 7/56 | Petroff | 73—71.4 |
| 2,832,903 | 4/58 | Carter | 310—27 |
| 2,873,604 | 2/59 | Samsel | 73—67.1 |
| 3,070,996 | 1/63 | Schloss et al. | 73—67.1 |

RICHARD C. QUEISSER, *Primary Examiner*.

JOHN P. BEAUCHAMP, *Examiner*.

UNITED STATES PATENT OFFICE
CERTIFICATE OF CORRECTION

Patent 3,162,039 December 22, 1964

Fred Schloss

It is hereby certified that error appears in the above numbered patent requiring correction and that the said Letters Patent should read as corrected below.

Column 1, line 14, for "elements" read -- element --; lines 22 to 24, the formula should appear as shown below instead of as in the patent:

$$Z = \frac{F}{V} = \frac{F\omega}{A}$$

Signed and sealed this 10th day of August 1965.

(SEAL)
Attest:

ERNEST W. SWIDER
Attesting Officer

EDWARD J. BRENNER
Commissioner of Patents